March 16, 1943.  E. H. BUCKNELL ET AL  2,314,071
PRESSURE CONTROL FITTING
Filed Sept. 19, 1941   2 Sheets-Sheet 1

Inventors
Ernest H. Bucknell
Ralph E. Bletcher
By Lyon & Lyon
Attorneys

March 16, 1943.   E. H. BUCKNELL ET AL   2,314,071
PRESSURE CONTROL FITTING
Filed Sept. 19, 1941   2 Sheets-Sheet 2

Inventors
Ernest H. Bucknell
Ralph E. Bletcher
By Lyon & Lyon
Attorneys

Patented Mar. 16, 1943

2,314,071

UNITED STATES PATENT OFFICE 2,314,071

PRESSURE CONTROL FITTING

Ernest H. Bucknell and Ralph E. Bletcher, Los Angeles, Calif., assignors, by mesne assignments, to Modern Faucet Co., Los Angeles, Calif., a copartnership Application September 19, 1941, Serial No. 411,544

4 Claims. (Cl. 277—1)

This invention relates to pressure control fittings, and is more particularly directed to a pressure controlled fixture for controlling the discharge of water to two outlets from the same source of supply. This invention is directed to an improvement over the unit assembly pressure control fitting set forth in the patent issued to E. H. Bucknell and R. E. Bletcher, No. 2,172,345, September 12, 1939.

It is an object of this invention to provide a pressure control fitting including a control unit assembly adapted for use in the fitting and which includes means for controlling the direction of flow of the water to one of the outlets in the fitting.

Another object of this invention is to provide a pressure control fitting which includes a unit assembly pressure control unit incorporating means to eliminate siphonic action.

Another object of this invention is to provide a pressure control fitting incorporating a removable directional control unit adapted to control direction of flow to two fitting outlets and which unit includes a removably mounted direction control member adapted to be translated to positions to control the direction of flow by the pressure of the water passing through the fitting and which unit includes a removably positioned element or barrier so carried and operated as to avoid siphonic action during the change of direction of flow of fluid through the fitting.

Other objects and advantages of this invention it is believed will be apparent from the following detailed description of a preferred embodiment thereof as illustrated in the accompanying drawings.

Figure 1:
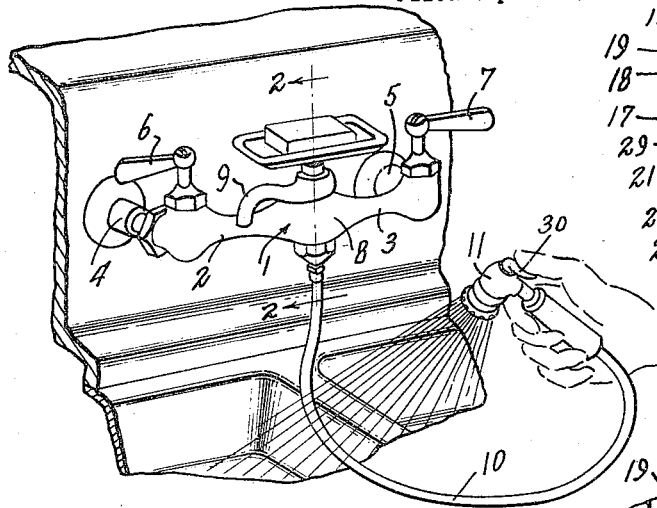
Figure 1 is a perspective view of a sink and spray fitting in which the pressure control means of our invention is incorporated.

In accordance with our invention as illustrated in Figures 1 to 7, inclusive, there is illustrated a sink fixture 1 which includes hot and cold water branches 2 and 3, respectively, which are connected to hot and cold water supply pipes 4 and 5, the flow of water to each branch being controlled by valves 6 and 7. The water flowing through the branches 2 and 3 is ordinarily mixed in a mixing chamber 8 and two outlets are provided from the fixture 1 to a spout 9, and in this case through a flexible conduit 10, to a spray head 11. Mounted within the mixing chamber 8 is a pressure control unit assembly 12 for controlling the flow of water from the mixing chamber 8 to the outlets 13 or 14 connected with the spout 9 and spray 11, respectively.

The unit assembly pressure directional control fitting 12 is removably mounted so as to permit its repair or replacement as occasion may demand. In this installation the flexible conduit 10 is connected to the mixing chamber 8 through the medium of a coupling nut 15 to which the conduit coupling 16 is threaded. The coupling nut 15 is provided with a cylindrical extension 17 and provides a carrier for the unit 12. Formed within the mixing chamber 8 is a cylindrical extension 18 providing a stop shoulder 19 for the anti-siphon floating diaphragm or barrier 20 of the unit 12. It is through the cylindrical extension 18 that water passage is had to the spout outlet 13. It is from within the interior of the cylindrical extension 17 that water passage is had to the spray outlet 14.

The unit 12 is preferably of the following construction and mode of operation:

The unit includes a plug or valve member 21 which carries at its lower end a combined differential piston and guide and supporting member 22. The guide and supporting member 22 has formed thereon a pair of diametrically opposed spacing fins 23 and a pair of supporting legs 24 adapted to rest upon the base support provided in this modification by a shoulder 25 formed within the nut 15. The supporting member 22 is carried upon the section 25' of reduced diameter of the plug or valve member 21. The plug 21 is secured at its upper end to a stem 26 which we refer to as a "pluck out" stem. Mounted at the upper end of the plug 21 is a disc 27 on which is provided a plurality of spacer prongs or guides 28 adapted to guide the valve centrally within the anti-siphon barrier 20. The anti-siphon barrier 20 is mounted loosely upon the cylindrical portion 29 of the plug 21 and forms a close-running fit therewith.

Figure 5:
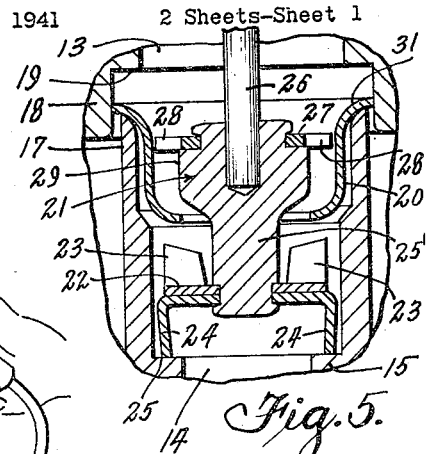
Figure 5 is an enlarged fragmental sectional elevation of the directional pressure control unit embodied in our invention illustrating the same in the anti-siphon position.
Figure 6:
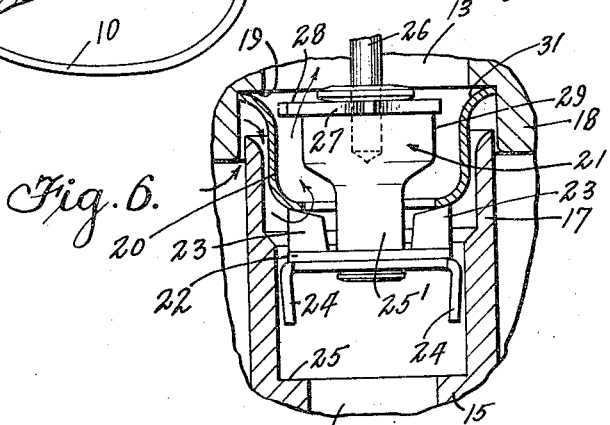
Figure 6 is a view similar to Figure 5 illustrating the parts of the control fitting as in position to direct the flow of water through one of the outlets here illustrated as to the spout of the sink fixture.
Figure 2:
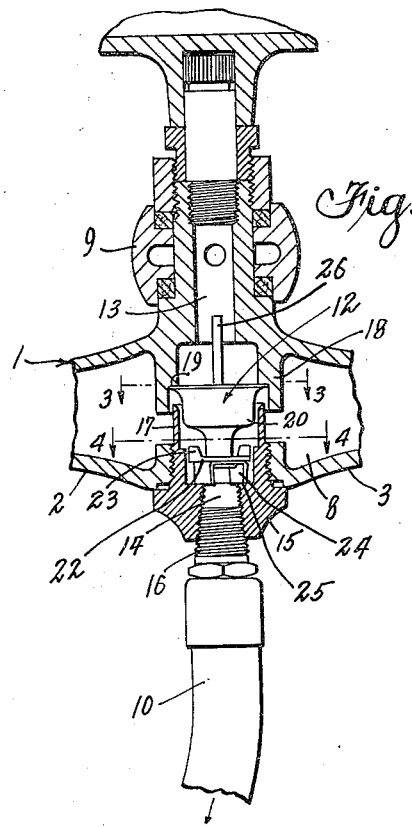
Figure 2 is a fragmental sectional view taken substantially on the line 2—2 of Figure 1.
Figure 7:
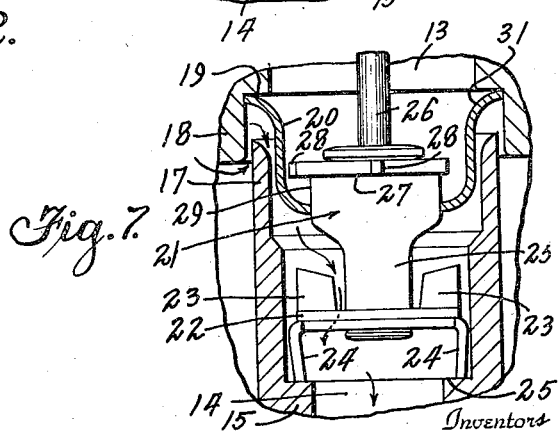
Figure 7 is a view similar to Figure 6 illustrating the parts as moved to opposite position or to the position to direct the flow of water to the spray.
Figure 3:
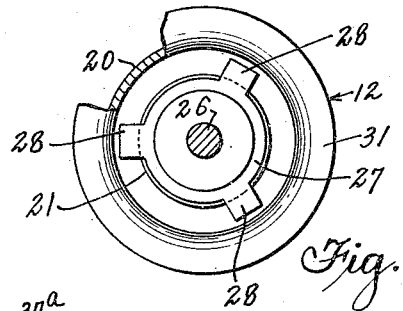
Figure 3 is a fragmental sectional plan view taken substantially on the line 3—3 of Figure 2.
Figure 4:
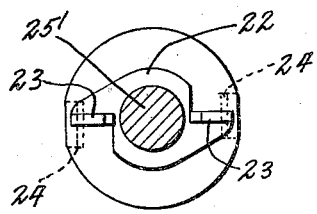
Figure 4 is a fragmental sectional plan view taken substantially on the line 4—4 of Figure 2.

The anti-siphon plug is adapted to move along the cylindrical surface to the respective positions illustrated in Figures 5, 6 and 7 and through the outlet 14.

Mounted in connection with the spray head 11 is a valve, the actuating handle of which is indicated at 30. This valve we have not deemed necessary to illustrate as it is of a construction well understood in this art and may be defined as a spring closure valve wherein closure of the valve is maintained under spring pressure and the pressure of the spring is overcome by manual pressure on the operating lever 30 to permit free flow of water through the spray head 11. When the operator releases the operating handle 30, the valve closes, thereby obstructing passage of water from the conduit 10 and spray outlet 14. In this condition a back pressure develops within the mixing chamber 8, causing the pressure of the water to raise the plug 21 to the position indicated in Figure 6 so that the direction of flow from the mixing chamber 8 is as indicated by the arrows in Figure 6. In this position the plug 21 is raised so that the guide fins 23 engage the lower end of the anti-siphon barrier 20 and passage of water is up through the opening through the bottom of the barrier 20 and hence to the spout outlet 13.

At times when no water pressure is present within the mixing chamber 8, the anti-siphon barrier 20 will move by gravity to the position indicated in Figure 5, that is, where its outwardly curved flange 31 is supported on the upper surface of the cylindrical extension or carrier 17, thereby closing off or obstructing flow of water from the mixing chamber 8 into the interior of the said carrier 17. This opens both outlets 13 and 14, avoiding the possibility of siphonic action developing in the fixture because of free venting of the interior of the chamber 8 to the atmosphere through the open spout 9.

At any time when the valve within the spray head 11 is open due to actuation of the lever 30, and water under pressure is entering from the mixing chamber 8, the directional control fitting 12 will assume the position as illustrated in Figure 7 and water will flow out the outlet 14. As the floating barrier or diaphragm 20 is of greater diameter than the plug or piston 21, it will be moved upward against the shoulder 19 arresting flow of water around the barrier 20 toward the outlet 13. As the area of the plug 21 is less than the area of the piston or guide 22, the force of the water will act to move the plug 21 to a position within the floating barrier 20 to stop flow of water out of the outlet 13. As long as the valve which controls the discharge of water through the outlet 14 is open, the parts will remain in this position as illustrated in Figure 7. When this valve is closed, the pressure upon the opposite sides of the piston or guide 22 will be equalized. The equalizing of the pressure within the chamber will result in the force of the water being exerted against the plug 21 to raise the plug 21 in the position indicated in Figure 6 with the result that the water will flow through the central aperture formed in the floating barrier 20 out through the outlet 13 through the spout 9.

Figure 9:
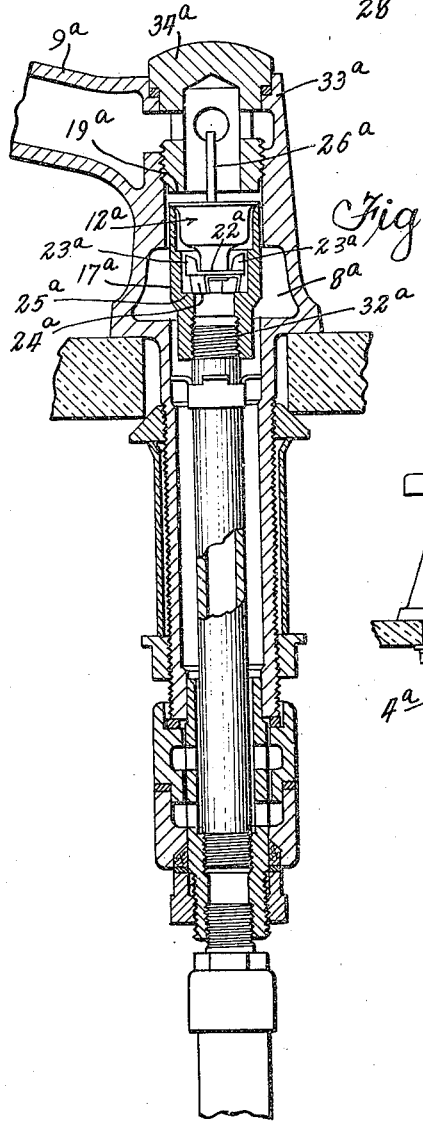
Figure 9 is a sectional elevation on an enlarged scale of the spout and connecting assembly of Figure 8.
Figure 8:
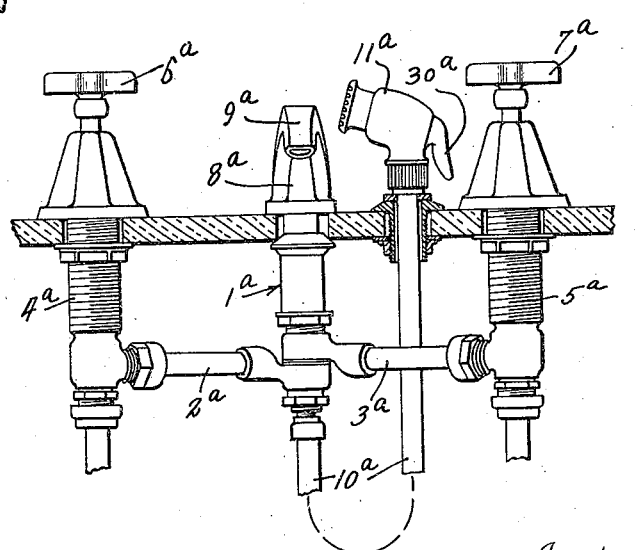
Figure 8 is a sectional elevation of the modified form of installation embodying our invention.

In the modifying form of structure illustrated in Figures 8 and 9, similar parts have been indicated by similar numerals with the addition of an exponent "a" thereto.

In this modification there is only illustrated a different manner of mounting of the unit 12ª, the mounting being within a carrier 17ª which is threaded to the upper end of a nipple 32ª supported within the mixing chamber 8ª. The unit 12ª is of the same construction but in this case is removably mounted through the upper end 33ª of the structure of the spout 9ª by removal of a nut 34ª and gripping the "pluck out" stem 26ª.

The two modifications differ also in that in the modification of Figures 8 and 9 the carrier 17ª may be said to be permanently positioned in the fitting while in the modification of Figures 1 to 7, inclusive, the carrier 17, being carried upon the nut 15, is removed with the removal of the unit 12.

Having fully described our invention, it is to be understood that we do not wish to be limited to the details herein set forth, but our invention is of the full scope of the appended claims.

We claim:

1. A pressure control fitting comprising: a member having a chamber, an inlet and two outlets communicating with said chamber, the first of said outlets being open to the atmosphere and the second of said outlets being valve controlled; a hollow cylindrical carrier in said chamber having its interior in communication with said second outlet; means providing a shoulder in said chamber adjacent the entrance to said first outlet, said shoulder being disposed in spaced confronting relation to the edge of said cylindrical carrier, the space between said shoulder and said edge communicating with said chamber; and a direction control unit mounted in said cylindrical carrier, said unit including a flow directing floating barrier having a flange adapted to alternatively be limited in its movement by engagement with said shoulder or the edge of said cylindrical carrier, said floating barrier also having a central flow passage, and a floating plug member extending through said flow passage and having an enlarged upper portion adapted to be positioned to obstruct flow through said passage and having a differential piston portion at its lower end below said flow passage, said cylindrical carrier having an internal seat forming a stop engageable by said piston portion to limit downward movement of said plug, said piston portion having stop means associated therewith to limit upward movement of said plug to non-flow obstructing position relative to said floating barrier, the effective area of said differential piston being greater than the effective area of said plug, and the effective area of said floating barrier being greater than the effective area of said differential piston, whereby when said second outlet is closed said floating barrier will be engaged with said shoulder by hydraulic pressure in said chamber and said piston will raise said plug to a non-flow obstructing position relative to said flow passage, and when said second outlet is open, hydraulic pressure will engage said floating barrier with said shoulder and said piston will engage said seat and said plug will be moved by said piston into flow obstructing position relative to said flow passage, and finally, when negative hydraulic pressure exists in said chamber, said floating barrier will engage the edge of said cylindrical carrier and said piston will engage said seat with said plug positioned in a non-flow obstructing position relative to said flow passage to prevent siphonic action.

2. A pressure control fitting comprising: a member having a chamber, an inlet and two outlets communicating with said chamber, the first of said outlets being open to the atmosphere and the second of said outlets being valve controlled; a hollow cylindrical carrier in said chamber having its interior in communication with said second outlet; a shouldered recess in said chamber spaced from said carrier including an annular top wall and a side wall, said cylindrical carrier projecting into said recess in telescoping relation to said side wall; and a directional control unit mounted in said carrier, said unit including a floating barrier having a central flow passage and a portion projecting into the space between said annular top wall and the adjacent edge of said carrier and adapted to alternatively be limited in its movement by said top wall or said edge, a floating plug member including an enlarged portion adapted to either permit or obstruct flow through said flow passage of said floating barrier, and a differential piston connected with said plug and positioned below said floating barrier, said cylindrical carrier having an internal seat forming a stop engageable by said piston to limit downward movement of said plug, said piston having stop means associated therewith to limit upward movement of said plug to non-flow obstructing position relative to said floating barrier, the effective area of said differential piston being greater than the effective area of said plug, and the effective area of said floating barrier being greater than the effective area of said differential piston, whereby when said second outlet is closed said floating barrier will be engaged with said annular top wall by hydraulic pressure in said chamber and said piston will raise said plug to a non-flow obstructing position relative to said flow passage, and when said second outlet is open, hydraulic pressure will engage said floating barrier with said annular top wall and said piston will engage said seat and said plug will be moved by said piston into flow-obstructing position relative to said flow passage, and finally, when negative hydraulic pressure exists in said chamber, said floating barrier will engage the edge of said cylindrical carrier and said piston will engage said seat with said plug positioned in a non-flow obstructing position relative to said flow passage to prevent siphonic action.

3. A pressure control fitting comprising: a member having a chamber, an inlet and two outlets communicating with said chamber, the first of said outlets being open to the atmosphere and the second of said outlets being valve controlled; a hollow cylindrical carrier in said chamber having its interior in communication with said second outlet; means providing a shoulder in said chamber adjacent the entrance to said first outlet, said shoulder being disposed in spaced confronting relation to the edge of said cylindrical carrier, the space between said shoulder and cylindrical carrier communicating with said chamber; and a directional control unit mounted in said cylindrical carrier, said unit including a flow directing floating barrier having means adapted to alternatively engage said shoulder or the edge of said cylindrical wall, to limit the movement thereof in opposite directions, said floating barrier also having a central flow passage, a floating plug member extending through said flow passage and having an enlarged upper portion adapted to be positioned to obstruct flow through said flow passage and having a lower differential piston portion disposed below said low opening, and means associated with said piston portion adapted to limit upward movement of said piston portion toward said floating barrier, said cylindrical carrier having an internal seat forming a stop engageable by said piston portion to limit downward movement of said plug, the effective area of said differential piston being greater than the effective area of said plug, and the effective area of said floating barrier being greater than the effective area of said differential piston, whereby when said second outlet is closed said floating barrier will be engaged with said shoulder by hydraulic pressure in said chamber and said piston will raise said plug to a non-flow obstructing position relative to said flow passage, and when said second outlet is open, hydraulic pressure will engage said floating barrier with said shoulder and said piston will engage said seat and said plug will be moved by said piston into flow obstructing position relative to said flow passage, and finally, when negative hydraulic pressure exists in said chamber, said floating barrier will engage the edge of said cylindrical carrier and said piston will engage said seat with said plug positioned in a non-flow obstructing position relative to said flow passage to prevent siphonic action.

4. A pressure control fitting comprising: a member having a chamber, an inlet and two outlets communicating with said chamber, the first of said outlets being open to the atmosphere and the second of said outlets being valve controlled; a carrier in said chamber having a hollow interior in communication with said second outlet; means providing a shoulder in said chamber adjacent the entrance to said first outlet, said shoulder being disposed in spaced confronting relation to said carrier, the space between said shoulder and carrier communicating with said chamber; and a directional control unit mounted in said carrier including an anti-siphon floating barrier having means adapted to alternatively engage said shoulder or carrier to limit movement of said barrier in opposite directions, said barrier also having an axial passage extending therethrough, a relatively movable plug mounted in said passage including a portion adapted to obstruct flow through said passage, and a differential piston operatively associated with a reduced portion of said plug and disposed below said passage, the effective area of said differential piston being greater than the effective area of said plug, and the effective area of said floating barrier being greater than the effective area of said differential piston, said carrier having an internal seat forming a stop engageable by said piston to limit downward movement of said plug, said piston having stop means associated therewith to limit upward movement of said plug to non-flow obstructing position relative to said floating barrier, the effective area of said differential piston being greater than the effective area of said plug, and the effective area of said floating barrier being greater than the effective area of said differential piston, whereby when said second outlet is closed said floating barrier will be engaged with said shoulder by hydraulic pressure in said chamber and said piston will raise said plug to a non-flow obstructing position relative to said flow passage, and when said second outlet is open, hydraulic pressure will engage said floating barrier with said shoulder and said piston will engage said seat and said plug will be moved by said piston into flow-obstructing position relative to said flow passage, and finally where negative hydraulic flow passage, and finally where negative hydraulic pressure exists in said chamber said floating barrier will engage said carrier and said piston will engage said seat with said plug positioned in a non-flowing obstructing position relative to said flow passage to prevent siphonic action.

ERNEST H. BUCKNELL.
RALPH E. BLETCHER.